United States Patent
Riseman et al.

(10) Patent No.: US 8,036,976 B2
(45) Date of Patent: Oct. 11, 2011

(54) SYSTEM AND METHOD FOR DERIVING DATA

(75) Inventors: Alexander C. Riseman, Irvington, NY (US); Edward R. Howorka, Morris Plains, NJ (US)

(73) Assignee: EBS Group Limited, London (GB)

( * ) Notice: Subject to any disclaimer, the term of this patent is extended or adjusted under 35 U.S.C. 154(b) by 877 days.

(21) Appl. No.: 10/525,750

(22) PCT Filed: Sep. 3, 2003

(86) PCT No.: PCT/US03/27333
§ 371 (c)(1),
(2), (4) Date: Aug. 22, 2005

(87) PCT Pub. No.: WO2004/023244
PCT Pub. Date: Mar. 18, 2004

(65) Prior Publication Data
US 2006/0167783 A1    Jul. 27, 2006

Related U.S. Application Data

(60) Provisional application No. 60/408,180, filed on Sep. 3, 2002.

(51) Int. Cl.
*G06Q 40/00* (2006.01)
(52) U.S. Cl. ............. 705/37; 705/35; 705/36 R; 705/38
(58) Field of Classification Search .............. 705/35, 705/36 R, 37, 1, 38
See application file for complete search history.

(56) References Cited

U.S. PATENT DOCUMENTS

| | | | | |
|---|---|---|---|---|
| 5,101,353 | A | * | 3/1992 | Lupien et al. ............. 705/37 |
| 5,136,501 | A | * | 8/1992 | Silverman et al. ........... 705/37 |
| 5,375,055 | A | | 12/1994 | Togher et al. |
| 6,014,627 | A | * | 1/2000 | Togher et al. ................ 705/1 |
| 6,098,051 | A | | 8/2000 | Lupien et al. |
| 6,405,180 | B2 | | 6/2002 | Tilfors et al. |
| 6,421,653 | B1 | | 7/2002 | May |
| 6,618,707 | B1 | * | 9/2003 | Gary ...................... 705/36 R |
| 6,629,082 | B1 | * | 9/2003 | Hambrecht et al. ....... 705/36 R |

(Continued)

FOREIGN PATENT DOCUMENTS

DE        100 63 828 A1    5/2001

(Continued)

OTHER PUBLICATIONS

Ref U—Clyde et al., Is it Efficient to impose costs on small-volume equity traders? International Journal of the Economics of Business, vol. 6, No. 1, 1999, pp. 81-92.*

(Continued)

*Primary Examiner* — Shahid Merchant
*Assistant Examiner* — Barbara Amelunxen
(74) *Attorney, Agent, or Firm* — Dickstein Shapiro LLP

(57) ABSTRACT

Best bid and best offer rate data from deals concluded on an anonymous trading system in a fungible instrument such as a foreign currency pair are processed to derive indicative rates. A minimum indicative rates spread between bid and offer prices is defined. The indicative rate bid and offer prices are set to the received best bid and offer prices and alternately an amount is added to the indicative offer rates and subtracted from the indicative bid rates until the spread between the indicative bid and offer rates is greater than or equal to the predefined minimum indicative rates spread and greater than the spread between the best bid and offer prices.

21 Claims, 6 Drawing Sheets

U.S. PATENT DOCUMENTS

| | | | |
|---|---|---|---|
| 6,912,511 B1* | 6/2005 | Eliezer et al. | 705/37 |
| 6,985,883 B1* | 1/2006 | Togher et al. | 705/37 |
| 7,127,424 B2* | 10/2006 | Kemp et al. | 705/37 |
| 7,146,336 B2* | 12/2006 | Olsen et al. | 705/37 |
| 7,308,428 B1* | 12/2007 | Federspiel et al. | 705/36 R |
| 7,315,838 B2* | 1/2008 | Gershon | 705/36 R |
| 7,627,520 B2* | 12/2009 | Wilson et al. | 705/37 |
| 7,707,091 B1* | 4/2010 | Kauffman et al. | 705/36 R |
| 2001/0037284 A1* | 11/2001 | Finkelstein et al. | 705/37 |
| 2001/0049651 A1* | 12/2001 | Selleck | 705/37 |
| 2002/0010673 A1* | 1/2002 | Muller et al. | 705/37 |
| 2002/0035520 A1* | 3/2002 | Weiss | 705/27 |
| 2002/0042765 A1* | 4/2002 | Dawson | 705/35 |
| 2002/0055897 A1* | 5/2002 | Shidler et al. | 705/35 |
| 2002/0107781 A1* | 8/2002 | Neyman et al. | 705/37 |
| 2003/0088501 A1* | 5/2003 | Gilbert et al. | 705/37 |
| 2003/0115131 A1* | 6/2003 | Heaton et al. | 705/37 |
| 2003/0130920 A1* | 7/2003 | Freund | 705/35 |
| 2004/0039685 A1* | 2/2004 | Hambrecht et al. | 705/37 |
| 2004/0243502 A1* | 12/2004 | Slowik et al. | 705/37 |
| 2004/0267655 A1* | 12/2004 | Davidowitz et al. | 705/37 |
| 2005/0010481 A1* | 1/2005 | Lutnick et al. | 705/26 |
| 2005/0027634 A1* | 2/2005 | Gershon | 705/37 |
| 2005/0228739 A1* | 10/2005 | Leibowitz | 705/37 |
| 2005/0228741 A1* | 10/2005 | Leibowitz | 705/37 |
| 2005/0283422 A1* | 12/2005 | Myr | 705/37 |
| 2006/0167783 A1* | 7/2006 | Riseman et al. | 705/37 |
| 2006/0224491 A1* | 10/2006 | Pinkava | 705/37 |
| 2006/0282367 A1* | 12/2006 | Katz et al. | 705/37 |
| 2007/0118459 A1* | 5/2007 | Bauerschmidt et al. | 705/37 |
| 2007/0192221 A1* | 8/2007 | Sandor et al. | 705/35 |
| 2008/0097889 A1* | 4/2008 | Wilson et al. | 705/37 |
| 2008/0222023 A1* | 9/2008 | Hambrecht et al. | 705/37 |

FOREIGN PATENT DOCUMENTS

| | | |
|---|---|---|
| EP | 0625275 A1 | 11/1994 |
| EP | 0 952 536 A1 | 10/1999 |
| JP | 2002-163451 A | 6/2002 |
| JP | 2002-352114 A | 12/2002 |
| JP | 2002-352115 A | 12/2002 |
| KR | 2002-0017537 | 3/2002 |
| WO | WO 00/68846 | 11/2000 |
| WO | WO 02/07039 * | 1/2002 |
| WO | WO 02/07039 A2 | 1/2002 |

OTHER PUBLICATIONS

Ref V—D. Freeman, Regional Tests of Okun's Law, International Advances in Economic Research, vol. 6, No. 3, p. 557, Aug. 2000.*
The U.K. Search Report issued Aug. 25, 2005.
The International Search Report issued for Parent PCT Application No. PCT/US2003/027333.

* cited by examiner

SYSTEM AND METHOD FOR DERIVING DATA

CROSS REFERENCE TO RELATED APPLICATIONS

This application is a National Stage filing under 35 U.S.C. 371 of International Application No. PCT/US03/27333, filed on Sep. 3, 2003, which designated the United States and which was in the English language, and claims priority benefit from U.S. Provisional Application No. 60/408,180, filed on Sep. 3, 2002.

This invention relates to a system and method for deriving data. It is particularly, but not exclusively, related to the derivation of financial data from data from trades of fungible instruments, such as financial instruments.

Many financial instruments are traded using automated trading systems. Many examples of these systems are known for trading a wide variety of financial instruments such as equities and foreign exchange (FX) products as well as commodities such as precious metals. One example of such a system is disclosed in EP-A-0,625,275 of EBS Dealing Resources Inc. This system is an anonymous trading system, which matches bids and offers entered by counterparties wishing to trade. A subset of parties' quotes are distributed to all traders having sufficient credit to deal the quotes and are displayed to the their at their trader terminals. Quotes input into the system remain anonymous until a deal has been done, at which point the identity of the parties, the price, and amount of the deal are revealed and distributed to traders. The system is used widely in the foreign exchange markets to trade FX Spot and commodities such as precious metals.

Trading systems such as that mentioned above generate a lot of information regarding the state of the market. This information, in the form of rates information, is very valuable and it is customary to charge clients for a rates feed, which gives them access to the current state of the markets.

For many fungible instruments there are different fora in which the instrument can be traded. However, in some cases, one particular forum will dominate. This is true of the FX Spot market where each of the major currency pairs that are traded, such as USD/EUR, USD/JPY etc, has a substantial proportion of its liquidity in one of the several trading systems on which it can be traded. Because of this, the rates feed from the dominant trading system provides an accurate view of the market and trends in the market.

It is desirable to be able to provide a data feed, which, while indicative of current rates in the market, does not provide those exact rates. There are two reasons for this. First, markets are volatile and a feed of actual rates can be confusing. Second, the data provider may wish to keep the actual rates information confidential.

A first aspect of the invention aims to provide a method and system which can process actual deal information to provide indicative rates information. Broadly, the indicative rates are derived from best bid and offer rates from the market by defining a minimum indicative rates spread between bid and offer prices and adjusting the best price rates to maintain a spread greater or equal to the defined minimum indicative rates spread and greater than the best price spread.

More specifically, there is provided a method of processing deal information relating to trades of a fungible instrument, comprising the steps of: receiving best price bid and offer rates for completed transactions in the instrument; and deriving indicative bid and offer rates from the best price bid and offer rates by defining a minimum indicative rates spread between bid and offer prices and adjusting the best price rates to maintain a spread greater or equal to the defined minimum indicative rates spread and greater than the best price spread.

This aspect of the invention also provides a system for processing deal information relating to trades of a fungible instrument, comprising: a processing module for receiving best price bid and offer rates for transactions in the instrument and processing the received rates to derive indicative bid and offer rates from the best price bid and offer rates by defining a minimum indicative rates spread between bid and offer prices and adjusting the best price rates to maintain a spread greater or equal to the defined minimum indicative rates spread and greater than the best price spread.

Preferably the derivation of indicative bid and offer rates comprises setting the indicative rate bid and offer prices to the received best bid and offer prices for completed transactions, and alternately adding an amount to the indicative offer rates and subtracting an amount from the indicative bid rates until the spread between the indicative bid and offer rates is greater than or equal to the predefined minimum indicative rates spread and greater than the spread between the best bid and offer prices.

Embodiments of the invention have the advantage of providing a representation of the market that cannot be reverse engineered to recover the actual bid and offer prices. The indicative prices have a minimum spread and can be used by subscribing institutions to pass to their clients knowing that they can make a profit trading at those rates. The indicative rates are relatively stable compared to the best rates and provide an envelope within which the best rates fluctuate. Thus, the slow moving envelope can provide a more informative view of actual market trends than very volatile actual deal information that moves at a high frequency within the envelope.

Preferably, the best price bid and offer rates for completed transactions are received from an automated trading system, for example an anonymous trading system. The best rates can then be fed by an automatic rates feed to the indicative rates processor.

Preferably the derivation of the indicative rates is repeated periodically. Preferably, the derivation is repeated if a received best bid or offer is outside the range of the indicative rates. Preferably, the derivation is repeated if the best prices spread widens such that the best prices are the same as the indicative rates. Preferably, the derivation is repeated if the best prices spread plus a predetermined amount is less than the indicative rates spread and the indicative rates spread is greater than the minimum indicative rates spread. Preferably, the derivation is repeated if one or both of the bid and offer sides of the best prices are unavailable and are then restored.

Preferably, the derived indicative rates are distributed to subscribers. This distribution may comprise forming an indicative rates panel for distribution and display at the subscribers, for example at a trader workstation or other display.

A second aspect of the invention provides a method of processing deal information relating to trades of a fungible instrument, comprising the steps of: receiving best price bid and offer rates for transactions in the instrument; and filtering received best price bid and offer rates to remove high frequency fluctuations in the received rates to obtain indicative bid and offer rates, the indicative rates being adjusted only to maintain a predetermined minimum spread.

This aspect of the invention also resides in a system for processing deal information relating to trades of a fungible instrument, comprising: a processing module for receiving best price bid and offer rates for transactions in the instrument; the processing module comprising: a filter for filtering received best price bid and offer rates to remove high frequency fluctuations in the received rates to obtain indicative bid and offer rates, and an indicative rates adjuster for adjusting the indicative rates only to maintain a predetermined minimum spread.

Embodiments of this aspect of the invention have the advantage the indicative rates are a slow moving envelope that removes the high frequency volatility of the actual dealt rates. This provides the market with indicative rates that are a better indicative of true market trends than the actual rates.

According to a third aspect of the invention a market high rate and market low rate are derived from the best bid and offer prices and distributed to subscribers. More specifically there is provided a method of processing deal information relating to trades of a fungible instrument to obtain market high and market low information, comprising the steps of: obtaining best bid and offer prices for completed deals in the instrument; testing the eligibility of a best price as a market high (offer) or market low (bid) by performing the steps of: discarding best prices for a deal amount less than a predetermined amount; and discarding best prices for which there is no supporting price for an amount greater or equal to the minimum amount at the same or a higher (for offer) or lower (for bid) price within a predetermined period; and establishing a market high or low from the highest or lowest remaining price if they exceed the existing market high or low.

This aspect of the invention also provides a system for processing deal information relating to trades of a fungible instrument, comprising: a processor for obtaining best bid and offer prices for completed deals in the instrument and processing the received best bid and offer prices to test the eligibility of a best price as a market high (offer) or market low (bid) by discarding best prices for a deal amount less than a predetermined amount and discarding best prices for which there is no supporting price for an amount greater or equal to the minimum amount at the same or a higher (for offer) or lower (for bid) price within a predetermined period, the processor further establishing a remaining price as a market high if it exceeds the existing market high or low.

Preferably, the step of testing eligibility further comprises discarding prices for deals completed between parties within a predetermined time of an earlier deal between the same parties, and preferably also discarding prices for deals completed between different trading floors of the same financial institution.

Preferably, absolute market high and market low rates may also be distributed to subscribers.

An embodiment of the invention in its various aspects will now be described with reference to the accompanying drawings in which.

Figure 1:
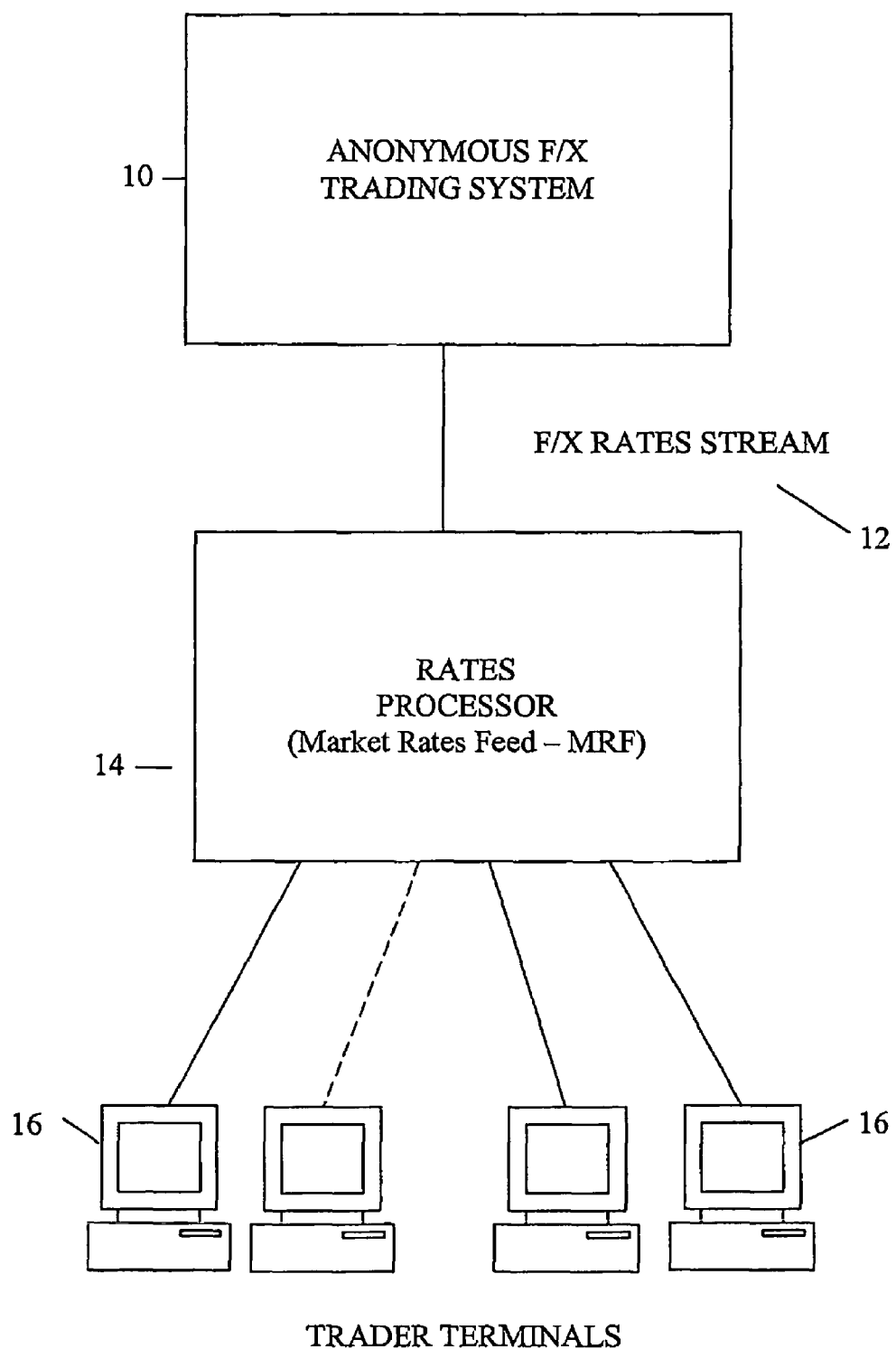
FIG. 1 is a schematic diagram of a system embodying the invention.

Referring initially to FIG. 1, an embodiment of the invention is shown schematically. An anonymous trading system 10 executes trades between counterparties based on bids and offers submitted by those counterparties. The trading system may be, for example that disclosed in EP-A-625,275 or any other trading system, whether or not it is anonymous or another source of dealt prices, for example a voice broker. The trading system 10 outputs a stream of deal related information in the form of an F/X rates stream 12. This includes the identities of parties that have traded and the price and volume of their trades. This information is passed to a rates processor 14, which operates on the price information to provide a number of rates based information streams to customers at trader terminals 16. The rates processor is also referred to as a Market Rates Feed (MRF). The rates information includes, in the preferred embodiment, the real time rates for the instrument being traded. In the case of an instrument such as FX Spot, this will be the real time spot rate. This data stream may include the best bid and offer and the last given and paid. An indicative rate feed is also provided which is derived from the best price data by an algorithm that will be described. This indicative rate presents an impartial indicator of the market to customers and is calculated from actual done deals rather than bids and offers that are pending in the system. In the case of a rate feed supplied by an anonymous trading system of the type referred to above, the anonymous trading system is used by professional interbank traders and so the indicative rates are an indicator of the professional interbank market.

Figure 2:
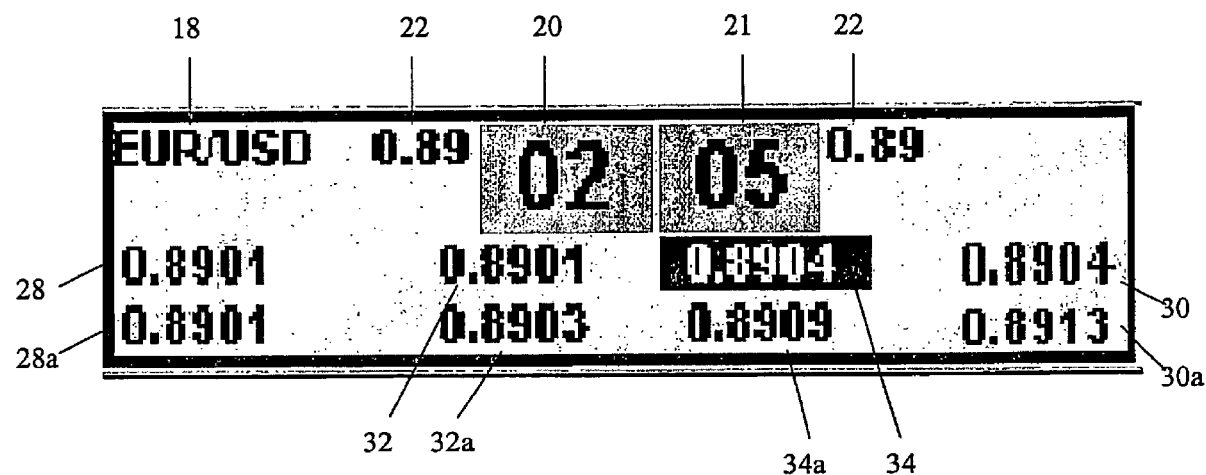
FIG. 2 is a view of an indicative rates display.
Figure 3:
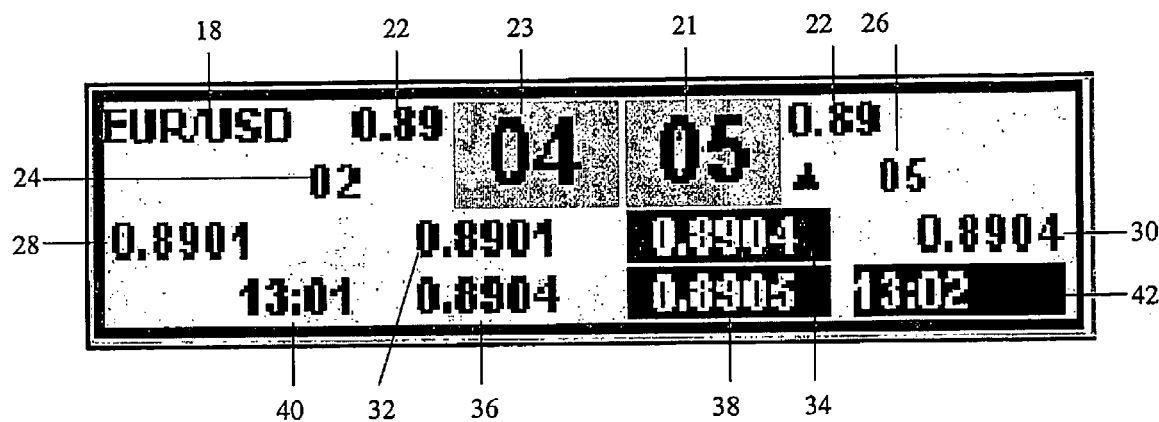
FIG. 3 is a view of a live rates panel showing market and touch low and high prices.

The following description will describe an algorithm for generating indicative rates from completed deal information provided from the anonymous trading system. It will then describe an algorithm for calculating supported market high and low information from that completed deal information. First, FIGS. 2 and 3 show how this information may be presented to users as a price panel which forms part of a trading or other display. FIG. 2 shows the indicative rates panel and FIG. 3 shows the market high/low panel. These may both be displayed on a trader's workstation together with other information, and may be turned on and off by the trader. The data may be provided in any other form as convenient and dependent on the privileges and subscriptions of a receiving party.

The rates processor 14 applies the algorithms to be described to the data received from the anonymous trading system or other source of dealt prices to provide the indicative rates embodying the first aspect of the invention and the market highs and lows embodying the second aspect of the invention.

FIGS. 2 and 3 show an example of a live rates display, which may be used where the instrument is FX Spot. Similar displays may be generated for other instruments but their exact content will depend on the characteristics of those instruments. In the examples of FIGS. 2 and 3, the display is one panel of a multipanel display, which occupies a trader's screen. Other display formats are possible.

FIG. 2 illustrates the indicative rates panel that may be provided, for example, to parties who are not trading on the anonymous trading system from which the rates information is derived. In the top left hand corner 18 of the display is an indication of the instrument being traded, in this example EUR/USD (Euro: US Dollar). In the top middle of the display are two enlarged figures. These represent the pips, or least significant digits of the currency being traded. These are the digits that are important to traders as they fluctuate with the market, whereas the more significant digits rarely, if ever, change. The enlarged pips, do not display actual best price information but the spread, or indicative, rates calculated using the algorithm to be described. Thus the figures displayed in boxes 20 and 21 are 02 and 05. The rates processor derives this view by applying an algorithm to the deal feed information received from the trading system. This is calculated only from actual done deals on the system and not from pending bids and offers which may never be dealt. The algorithm does not simply apply a minimum spread to the rates coming from the trading system. It is desirable that the best prices information from which the spread, or indicative, rates data have been calculated cannot be reverse engineered by the recipients. The live rates information is valuable and commercially sensitive.

On the left of the bid pips 20 and on the right of the offer pips 21 are the most significant digits 22 in the dealt prices, also known as the big figure, in this case, 0.89. In the row of figures below are, on the outside, the touch low and touch high FIGS. 28, 30 and, on their inside, the market low and market high FIGS. 32 34. These figures are explained below. The bottom row of figures shows the touch and market highs and lows 28a, 30a, 32a and 34a from the previous day's trading.

Turning now to FIG. 3, there is shown a market low/high rates display. In the top left hand corner of the display is an indication 18 of the instrument that is being traded. In this case it is EUR/USD (Euro/US Dollar). In the centre of the display, shown enlarged, are the present best bid and offer in the market. The enlarged numbers 23, here 04 and 05, are only the least significant digits of the price, known as the 'pips'. The pips may have a background colour, which indicates the direction of change, for example if the market is going up, the background may be green; if it is going down the background may be red. A similarly coloured arrow on the left or right of the big figure also shows the direction of the market. In FIG. 3, an upwards arrow is shown on the high side of the display. To the left of the bid and to the right of the offer pips are shown the most significant digits 22 of the price, in each case 0.89. Thus the display informs the trader that the best bid in the market is at 0.8904 Euros to the dollar and the best offer is 0.8905 Euros/dollar. These prices are pending quotes rather than done deals.

Beneath the most significant digits, and preferably in a different colour to other information on the screen is shown the spread or indicative rates pips field 24 (bid) and 26 (offer). It will be noted that the spread rate shown is greater than the actual difference between the rates 04 and 05 shown in the enlarged pips boxes. The rates processor 14 applies a minimum spread rate, which is dependent on the instrument being traded. In this case, the minimum spread for EUR/USD is 3 pips and so the spread is shown as 02/05 indicating rates of 0.8902 and 0.8905. The manner in which the spread or indicative rates are calculated is discussed below. The row of figures below the best bid and best offer pips displays market high and market low information. The outside, far left and far right figures show the touch low 28 and touch high 30 figures respectively. These, as the name suggests, are the absolute low and high values in the market with no parameters attached. Inside these figures are market low 32 and market high 34 prices. These are reliable market high and low prices which are calculated according to an algorithm, which is described below. The market high price 34 is shown highlighted, in practice on a colour display, in a different colour indicating that the price has changed. Conveniently this is done by reversing the colour.

The bottom line of the panel shows, at 36 and 38 respectively, the last dealt low and high prices, and outside them, the times 40, 42 at which they were dealt. Thus, for example, the last dealt low is 0.8904 and was dealt at 13.01.

The indicative rates algorithm will now be described. The algorithm fixes the indicative rates bid, or offer, as never being better than the Best bid or offer and fixes the indicative rates spread as being greater than or equal to a minimum rates spread defined for the instrument being traded. Generally, this spread will be broader, the less liquidity there is in the market for the instrument.

The algorithm requires that the indicative rates spread will be strictly greater than the best rates spread. Thus, if there is a spread of 5 pips shown on the best rates display of FIG. 2, the indicative rates display will be at least 6 pips.

Where there is only a one sided best price, that is there is either no best bid price or best offer price, or there are no best prices, the indicative rates are withheld. That is there are no indicative rates on either side if one or both best bid sides are missing. This is a consequence of the indicative rates spread being greater than the best rates spread.

Figure 4:
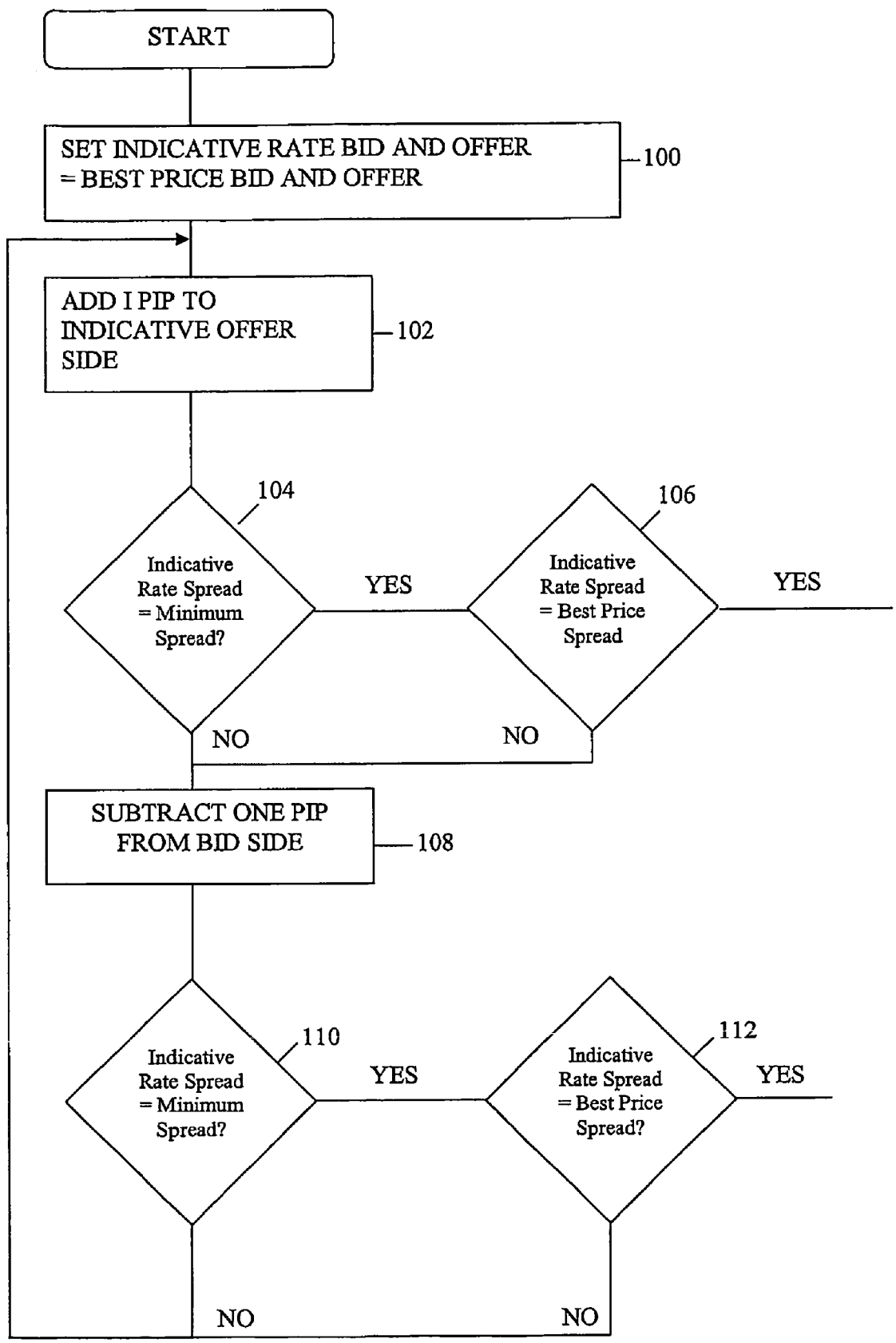
FIG. 4 is a flow chart showing the generation of indicative rates from market data.

The indicative rates are initially calculated to satisfy the criteria set out above. The process is indicated in FIG. 4, which is a flow chart of the indicative rate creation and maintenance process. On start up, at step 100, the indicative rate bid and offer is set to the present best price bid and offer. One pip is then alternately added to the Indicative rates offer side and subtracted from the bid side until the Indicative rates spread becomes greater than or equal to the minimum indicative rates spread defined for that instrument and greater than the best price spread. Preferably, if the best offer price is odd, the spreading process starts with the offer side, and if even, with the bid side although the process may be performed the other way round.

Thus, in FIG. 4, one pip is added to the indicative offer side at step 102 and at 104 a check is made to determine whether the indicative rate spread is greater or equal to the minimum spread. Then at 106, the indicative rate spread is checked to determine whether it is greater than the best price spread. If either of conditions 104 and 106 is not fulfilled, the process moves to step 108 in which a pip is subtracted from the indicative bid side. At steps 110 and 112, the same two tests are applied again as in steps 104 and 106. In this case, if either of the tests is not met, the process loops back to step 102 and a further pip is added to the indicative offer side.

Once a stable indicative spread has been achieved recalculation will be required under a variety of circumstances. The Indicative rates are first calculated when the system is switched on and the recalculated at random intervals thereafter. This may be, for example, at roughly one minute intervals. The rates will be recalculated when the Best bid or offer moves outside the Indicative rates range or when the Best Prices spread widens such that it becomes equal to the Indicative rates. It will be seen that in the two situations, the initial criteria of steps 104 and 106 are no longer met.

The indicative rates will also be recalculated when the best prices spread plus an additional pip is less than the indicative rates spread, while the indicative rates spread is greater than the minimum defined indicative rates spread for that instrument. In this case the Indicative rates spread has widened such that it is now two pips wider than the best prices spread and wider than the minimum spread for that instrument.

Finally, recalculation is required if the best price disappears or becomes one sided, in which case the Indicative rate is not shown. When the best prices become two sided again the indicative rate is recalculated.

Figure 5:
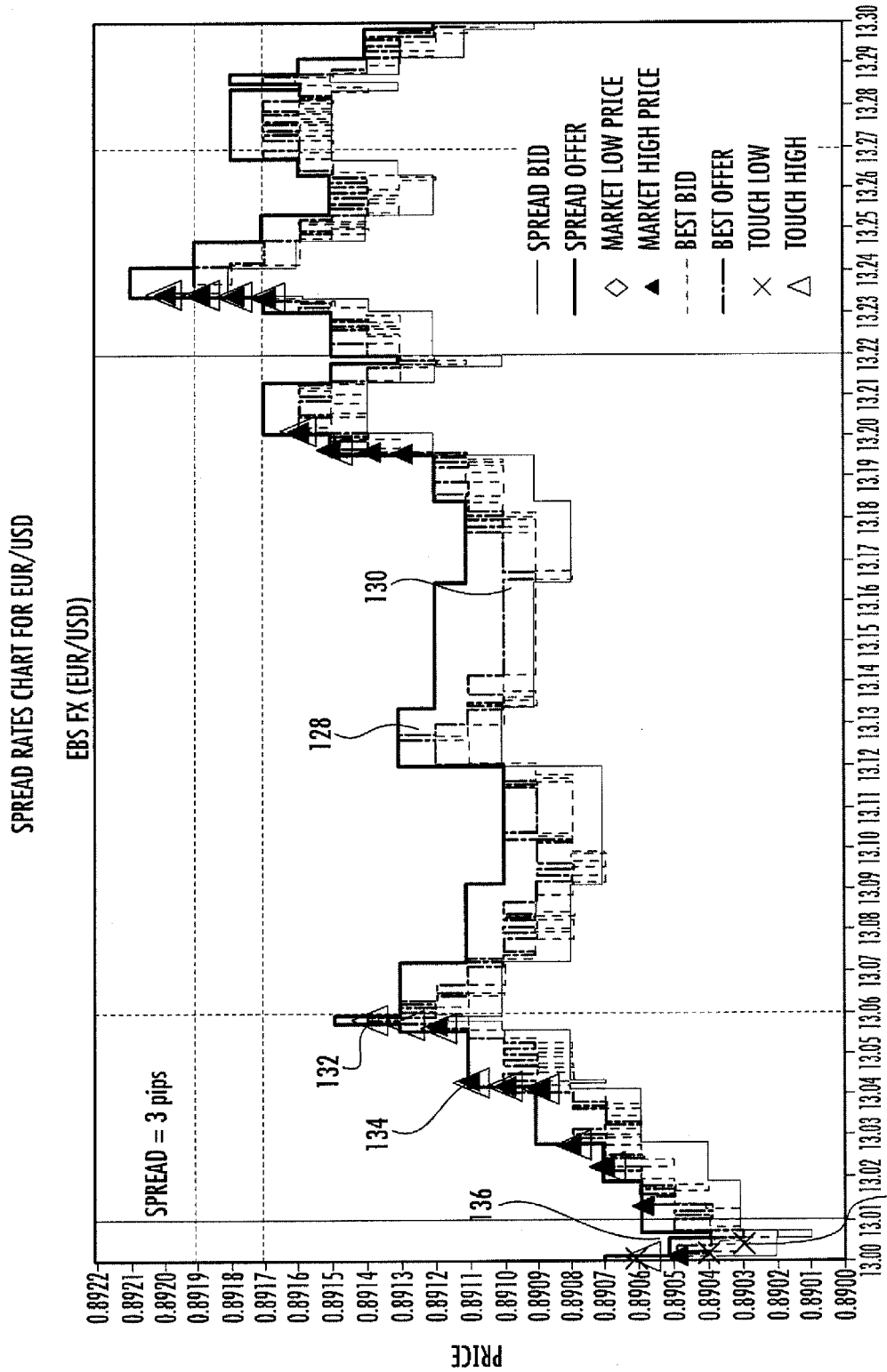
FIG. 5 is a chart of spread rates for a currency pair over a trading day.

FIG. 5 shows how the best rates and the indicative rates may vary over a portion of a typical trading day. The indicative or spread offer rate is shown by line 120 and the indicative or spread bid rate is shown by line 122. These two rates form an upper and lower boundary within which the best offer and bid rates, shown by dashed line 124 and line 126 respectively, fluctuate with a much greater frequency of movement. It will be seen that there is no fixed distance between the spread offer and the best offer or the spread bid and the best bid. Thus, for example, at point 128, the best offer and the spread offer are the same, whereas at point 130 they are two pips apart. The same sorts of variations can be seen between the spread bid and the best bid prices.

Thus it will be appreciated that the best bid and best offer prices cannot be reverse engineered from the spread bid and offer prices and that the spread prices form an envelope around the best prices within which the best prices move.

The chart of FIG. 5 also indicates the touch high price shown as open triangle 132 and the market high price shown as solid triangle 134. Similarly, cross 136 denotes the touch low price and the solid diamond 136 denotes the market low price. The touch high and low prices denote the highest or lowest rates dealt, regardless of the amount or number of counterparties involved. The market high and low prices are the absolute highest and lowest rates dealt with regard to generally accepted market conventions of amounts and/or the number of counterparties dealing at the rate. The exact definition of the amounts and numbers will vary from instrument to instrument. Thus it can be seen that the market highs and lows are a better indication of the general market conditions.

While a significant advantage of the algorithm described is to make it impossible to reverse engineer the actual rates information from the indicative rates, the algorithm does present further advantages. It will be appreciated from a consideration of FIG. 5 that there is a lot of noise in the deal envelope. This means that the deal prices move up and down very rapidly, but the market only moves slowly up and down over time. The algorithm described operates by only changing the indicative rate when there has been a significant move in the market and thus acts to filter out the high frequency volatility in the market. As a result, the prices presented are a good indication of the actual trends in the market. In this respect, the algorithm may be considered as performing a low pass filtering operation on the rates information.

The market high and low rate may be computed using the following definition: A deal is confirmed for market high (low) computation if at least X millions are dealt at the deal price or higher (lower) among at least Y different counterparties within a two minute time interval centered at the deal time. X and Y are currency pair or instrument dependent parameters. An example or EUR/USD might be $10M and two counterparties. The time of two minutes is not fixed and may be varied as required. Thus the market high and low is not an absolute measure of the market high and low, which is given by the touch high and low rates. It is, however, a supported measure. That is, it is an accurate view of where the market has actually reached that is based not on a single deal, which could be a rogue deal, for example by a party with very poor credit that is forced to accept a price that is not representative of the true state of the market, or a deal for a very small amount. The market high/low calulation fixes the market high/low in time by requiring it to be supported by other prices occurring within a certain time, for example one minute before and after in the example above. The result is a price, which is far more reliable than touch highs and lows, and a more accurate reflection of the market than previous attempts to define market highs and lows.

In the embodiment described above, a deal is considered to be supported if there is a deal at the same price or higher (lower for a market low) a given time (eg one minute) either side of the deal time. Preferably, intrabank deals, that is deals between different floors of the same institution are excluded from consideration of a supported deal. Preferably, deals between the same two parties are also excluded, to prevent two parties colluding into trying to rig the market. Thus, deals involving a minimum of three parties must be involved from different institutions. A minimum deal amount may also be applied before a deal can qualify to be used to support a market high or low.

Thus, the market high/low calculation is based on a minimum deal amount, two or more counterparties (that is three or more parties), and more than one transaction close in time to each other.

In the embodiment described, the market high/low is the rate of an actual deal that has taken place. However, it could be a notional rate that is derived from deals meeting the criteria set out above, for example an extrapolation that produces a theoretical rate rather than a rate at which a deal has actually been transacted.

Figure 6:
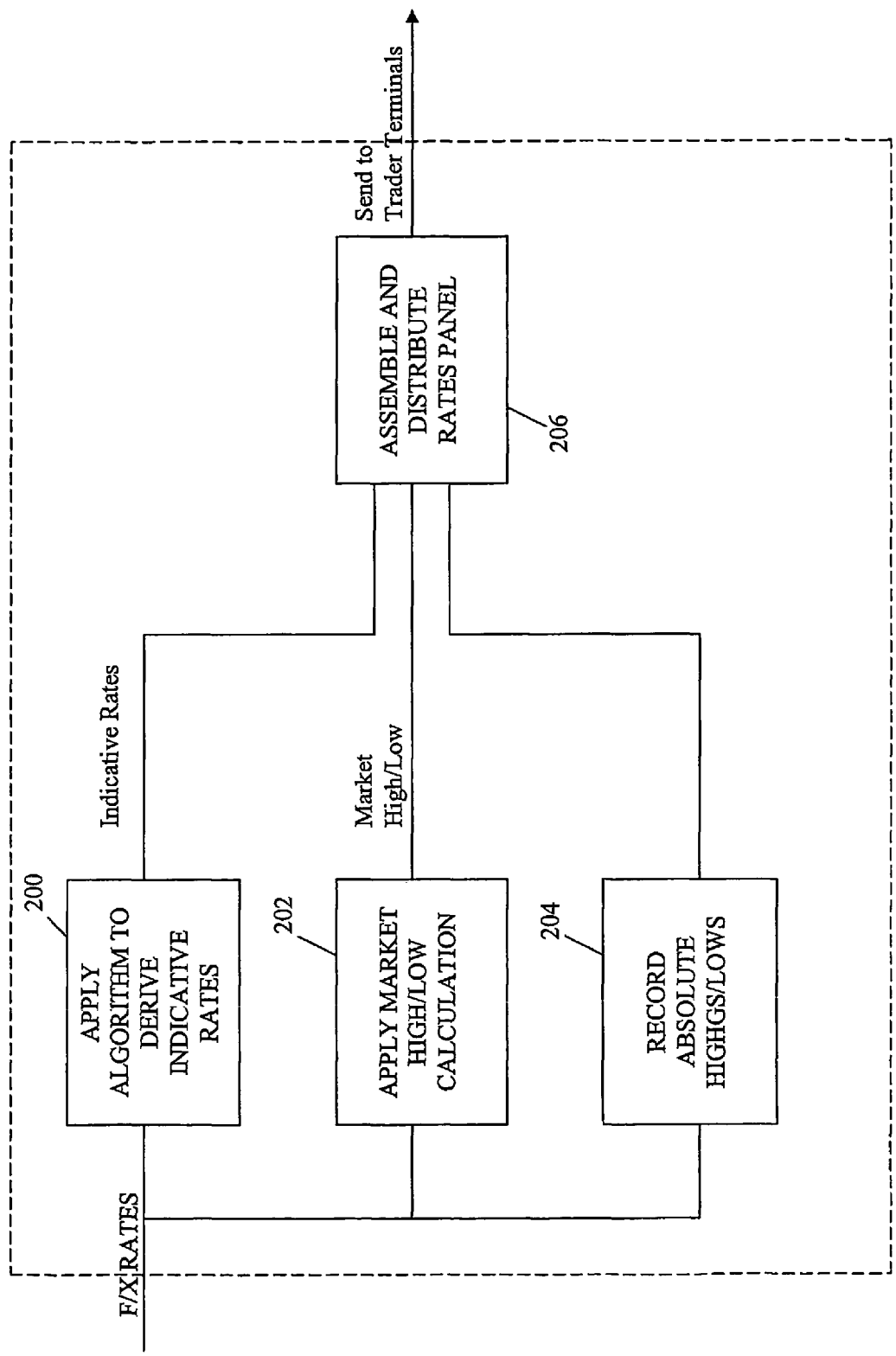
FIG. 6 is a schematic block diagram of the functions performed by the rates processor.

It will be appreciated from the foregoing discussion that the rates processor performs the steps illustrated in FIG. 4 and the recalculation of the indicative rates described above. It also calculates the market highs and lows, records the actual highs and lows and distributes all the rates data to the trader terminals. This functionality is illustrated schematically in FIG. 6.

Thus the rates processor 14 includes a module 200 which applies the algorithm to calculate the indicative rates and recalculate those rates according to the rules discussed above. It includes a module 202, which applies the market high and low calculations, and a module 204 which records the absolute highs and lows. It also includes a module, which takes the data output from the modules 200, 202 and 204, and forms the rates panels for distribution to the trader terminals.

Many modifications are possible to the embodiments described and will occur to those skilled in the art without departing from the scope of the aspects of the invention which is defined solely by the following claims. For example, the nature of the source of the dealt prices from which the indicative rates are calculated, or the source of the best prices from which the market highs and lows are calculated are not important and could be a trading system or other source.

The invention claimed is:

1. A computer system comprising one or more computers on a network, the one or more computers being configured to process deal information relating to completed transactions of a fungible instrument, comprising:
   a receiver configured to receive best price bid and offer rates of completed transactions in the instrument;
   a rates processor configured to calculate indicative bid and offer rates from the received best price bid and offer rates of completed transactions based on a predefined minimum indicative rates spread between bid and offer prices by adjusting the received best price bid and offer rates to maintain a spread:
   (i) greater than or equal to the predefined minimum indicative rates spread, and
   (ii) greater than a spread between the received best price bid and offer rates; and
   a data feed for providing the indicative bid and offer rates.

2. A computer system according to claim 1, wherein the best price bid and offer rates are received from an automated trading system.

3. A computer system according to claim 2, wherein the best price bid and offer rates are received from an anonymous trading system.

4. A computer system according to claim 1, wherein the rates processor is further configured to set the indicative rate bid and offer prices to the received best bid and offer prices, and to alternately add an amount to the indicative offer rates and subtract an amount from the indicative bid rates until the spread between the indicative bid and offer rates is:
   (i) greater than or equal to the predefined minimum indicative rates spread, and (ii) greater than the spread between the received best price bid and offer rates.

5. A computer system according to claim 4 wherein the amount to add or subtract is a single pip.

6. A computer system according to claim 1, wherein the rates processor is further configured to periodically repeat the calculation of the indicative rates.

7. A computer system according to claim 1, wherein the rates processor is further configured to repeat the calculation of the indicative rates if a received best bid or offer is outside the range of the indicative rates.

8. A computer system according to claim 1, wherein the rates processor is further configured to repeat the calculation of the indicative rates if the spread between the received best prices bid and offer rates widens such that the best prices are the same as the indicative rates.

9. A computer system according to claim 1, wherein the rates processor is further configured to repeat the calculation of the indicative rates if the spread between the received best price bid and offer rates plus a predetermined amount is less than the indicative rates spread and the indicative rates spread is greater than the minimum indicative rates spread.

10. A computer system according to claim 1, wherein the rates processor is further configured to repeat the calculation of the indicative rates if one or both of the bid and offer sides of the best prices are unavailable and are then restored.

11. A computer system according to claim 1, wherein the one or more computers are further configured to distribute the calculated indicative rates to subscribers.

12. A computer system according to claim 11, wherein the one or more computers are configured to distribute indicative rates by forming an indicative rates panel for distribution and display at the subscribers.

13. A computer system according to claim 1, wherein the rates processor is further configured to calculate a market high rate and market low rate from the best bid and offer prices and the one or more computers are configured to distribute the market high rate and market low rate to subscribers.

14. A computer system according to claim 13, wherein the rates processor is configured to calculate the market high and low rates by discarding from the received best bids and offers bids and offer prices for which less than a predetermined volume has been dealt at that price between a predetermined number of counterparties over a predetermined period.

15. A computer system according to claim 1, wherein the rates processor is configured to record absolute market high and market low rates.

16. A computer system according to claim 15, wherein the one or more computers are configured to distribute the absolute market high and low rates to subscribers.

17. A computer system comprising one or more computers on a network, the one or more computers being configured to process deal information relating to completed transactions of a fungible instrument, comprising:
a receiver configured to receive best price bid and offer rates of completed transactions in the instrument;
a rates processor configured to calculate indicative bid and offer rates from the received best price bid and offer rates of completed transactions based on a predefined minimum indicative rates spread between bid and offer prices, by setting the indicative rate bid and offer prices to the received best bid and offer prices and by alternately adding an amount to the indicative offer rates and subtracting an amount from the indicative bid rates until the spread between the indicative bid and offer rates is:
(i) greater than or equal to the predefined minimum indicative rates spread, and
(ii) greater than a spread between the received best price bid and offer rates; and
a data feed for providing the indicative bid and offer rates.

18. A computer system comprising one or more computers on a network, the one or more computers being configured to process deal information relating to completed transactions of a fungible instrument, the computer system comprising:
a receiver configured to receive best price bid and offer rates of completed transactions in the instrument;
a rates processor configured to calculate indicative bid and offer rates by: filtering the received best price bid and offer rates of completed transactions to remove high frequency fluctuations in the received best price bid and offer rates, and adjusting only the filtered best price bid and offer rates to maintain a predetermined minimum spread; and
a data feed for providing the calculated indicative bid and offer rates.

19. A computer system according to claim 18, wherein the rates processor is further configured to adjust indicative rates by adjusting the received best price bid and offer rates to maintain a bid/offer price spread:
(i) greater than or equal to a predefined minimum rates spread, and
(ii) greater than a spread between the received best price bid and offer rates.

20. A computer readable storage medium having recorded thereon computer code which when run on a computer causes the computer to process deal information relating to completed transactions of a fungible instrument by:
receiving best price bid and offer rates of completed transactions in the instrument;
calculating indicative bid and offer rates from the received best price bid and offer rates based on a predefined minimum indicative rates spread between bid and offer prices and adjusting the received best price bid and offer rates to maintain a spread:
(i) greater than or equal to the predefined minimum indicative rates spread, and
(ii) greater than a spread between the received best price bid and offer rates; and
providing the indicative bid and offer rates in a data feed.

21. A computer readable storage medium having recorded thereon computer code which when run on a computer causes the computer to process deal information relating to completed transactions of a fungible instrument by:
receiving best price bid and offer rates of completed transactions in the instrument;
calculating indicative bid and offer rates from the received best price bid and offer rates based on a predefined minimum indicative rates spread between bid and offer prices, setting the indicative bid and offer rates to the received best price bid and offer prices and alternately adding an amount to the indicative offer rates and subtracting an amount from the indicative bid rates until the spread between the indicative bid and offer rates is:
(i) greater than or equal to the predefined minimum indicative rates spread, and
(ii) greater than a spread between the received best price bid and offer rates; and
providing the indicative bid and offer rates in a data feed.

* * * * *